(12) United States Patent
Boek et al.

(10) Patent No.: US 9,034,787 B2
(45) Date of Patent: May 19, 2015

(54) CERAMIC ARTICLES AND METHODS OF PRODUCING CERAMIC ARTICLES

(75) Inventors: Heather Debra Boek, Corning, NY (US); Matthew John Dejneka, Corning, NY (US); Mark Owen Weller, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1448 days.

(21) Appl. No.: 12/474,771

(22) Filed: May 29, 2009

(65) Prior Publication Data

US 2010/0304965 A1 Dec. 2, 2010

(51) Int. Cl.

| | |
|---|---|
| *B01J 23/04* | (2006.01) |
| *B01J 23/00* | (2006.01) |
| *C04B 35/462* | (2006.01) |
| *B01D 53/88* | (2006.01) |
| *B01J 23/20* | (2006.01) |
| *B01J 35/04* | (2006.01) |
| *C04B 38/00* | (2006.01) |
| *C04B 35/478* | (2006.01) |
| *B01J 21/06* | (2006.01) |

(Continued)

(52) U.S. Cl.
CPC .............. *C04B 35/462* (2013.01); *B01D 53/88* (2013.01); *B01D 2255/2022* (2013.01); *B01D 2257/404* (2013.01); *B01D 2257/502* (2013.01); *B01D 2257/702* (2013.01); *B01D 2258/012* (2013.01); *B01D 2258/014* (2013.01); *B01J 21/063* (2013.01); *B01J 21/066* (2013.01); *B01J 23/002* (2013.01); *B01J 23/20* (2013.01); *B01J 23/6484* (2013.01); *B01J 35/04* (2013.01); *B01J 35/1033* (2013.01); *B01J 37/0018* (2013.01); *B01J 2523/00* (2013.01); *C04B 38/0006* (2013.01); *C04B 2111/00793* (2013.01); *C04B 2111/0081* (2013.01); *C04B 35/478* (2013.01); *C04B 2235/3249* (2013.01); *C04B 2235/3251* (2013.01); *C04B 2235/656* (2013.01); *C04B 2235/80* (2013.01); *C04B 2235/96* (2013.01); *C04B 2235/9607* (2013.01)

(58) Field of Classification Search
CPC  C04B 35/462; C04B 35/478; C04B 38/0006; B01J 23/20; B01D 53/88
USPC ............................ 501/80, 105; 502/100, 344
IPC .............................................. B01J 23/00, 23/04
See application file for complete search history.

(56) References Cited

U.S. PATENT DOCUMENTS 5,334,350 A * 8/1994 Friese et al. .................... 422/98
5,595,677 A    1/1997 Neurgaonkar et al.

(Continued)

FOREIGN PATENT DOCUMENTS

EP           399750 A1 * 11/1990 .............. C04B 35/58

OTHER PUBLICATIONS

DieselNet: Diesel Engine Emissions Online, http://www.dieselnet.com, Apr. 14, 2009.

(Continued)

*Primary Examiner* — Jun Li
(74) *Attorney, Agent, or Firm* — Joseph M. Homa; Matthew B. McNutt

(57) ABSTRACT

A ceramic article may comprise a sintered phase ceramic composition comprising aluminum titanate ($Al_2TiO_5$), zirconium titanate ($ZrTiO_4$), and a niobium-doped phase.

12 Claims, 4 Drawing Sheets

(51) Int. Cl.
*B01J 23/648* (2006.01)
*B01J 35/10* (2006.01)
*B01J 37/00* (2006.01)
*C04B 111/00* (2006.01)

(56) References Cited

U.S. PATENT DOCUMENTS

| | | | |
|---|---|---|---|
| 6,194,083 | B1 | 2/2001 | Yasuda et al. |
| 6,399,528 | B1 | 6/2002 | Krell et al. |
| 6,558,582 | B1 * | 5/2003 | Hayasaki et al. .......... 252/518.1 |
| 6,610,623 | B1 | 8/2003 | Alford et al. |
| 6,737,376 | B1 * | 5/2004 | Heckmann et al. ............. 501/80 |
| 2008/0203627 | A1 | 8/2008 | Ogunwumi et al. |

OTHER PUBLICATIONS

Hachisuka, I., et al. "Improvement of NOx Storage-Reduction Catalyst", SAE Technical Paper 2002-01-0732, Mar. 4-7, 2002.
Majewski, W.A., "NOx Absorbers", http://www.dieselnet.com/tech/cat_nox-trap.html, Oct. 2007.
Fridell, Erik, et al., "NOx Storage in Barium-Containing Catalysts", Journal of Catalysis 183, 196-209 (1999).
Takahashi, Naoki et al., The new concept 3-way catalyst for automotive lean-burn engine: NOx storage and reduction catalyst, Catalysis Today (1996) 63-69.
Rohr, F., et al., "NOx-Storage Catalyst Systems Designed to Comply with North American Emission Legislation for Diesel Passenger Cars", SAE Technical Paper 2006-01-1369, Apr. 3-6, 2006.
Rohr, F., et. al. "Diesel NOx-Storage Catalyst Systems for Tier 2 BIN5 Legislation", SAE Technical Paper 2008-01-0766, Apr. 14-17, 2008.
Epling, William S., et al., "The effects of $CO_2$ and $H_2O$ on the NOx destruction performance of a model NOx storage/reduction catalyst", Catalysis Letters vol. 90, Nos. 1-2, Sep. 2003, p. 45-56.
Huang, Helen Y., et al., "Removal of NO By Reversible Adsorption on Fe-Mn Based Transition Metal Oxides", Langmuir 2001, 17, 4997-5003.
Yang, R.T., "Reversible chemisorption of nitric oxide in the presence of oxygen on titania and titania modified with surface sulfate", Applied Catalysis A: General 169 (1998) 215-225.
Kim, Jeong, Y., et al., "Laboratory Studies and Mathematical Modeling of Urea SCR Catalyst Performance", SAE Technical Paper 2007-01-1573, Apr. 16-19, 2007.

* cited by examiner

CERAMIC ARTICLES AND METHODS OF PRODUCING CERAMIC ARTICLES

TECHNICAL FIELD

The present teachings relate to ceramic articles, and methods of producing ceramic articles. More particularly, the present teachings relate to ceramic articles, and methods of producing ceramic articles, useful for treating flowing streams, such as, for example, waste gases.

BACKGROUND

Environmental concerns have motivated the implementation of emission requirements for internal combustion engines and other combustion systems throughout much of the world. Catalytic converters have been used to eliminate many of the pollutants present in exhaust gas; however, an adsorption/catalyst medium is often used to remove nitrogen oxide (NOx) gases, such as, for example, NO and $NO_2$, which are produced as a byproduct of the combustion process. Lean NOx traps (LNT), for example, are widely used in after-treatment systems for removing NOx from both gasoline direct injected engine (GDI) and light-duty diesel engine (LDD) exhaust gas. One LNT configuration comprises a NOx adsorber/catalyst (i.e., storage) material coated on a porous ceramic matrix with parallel passageways through which exhaust gas may flow, sometimes referred to as a honeycomb catalyst substrate or filter. NOx subsequently adsorbs onto the solid surface of the storage material during an engine's lean-burn mode, and is desorbed (i.e., reduced) during rich air-to-fuel mixtures. In other words, NOx can be stored during lean exhaust (e.g., high $O_2$) conditions and released as $N_2$ during rich (e.g., low $O_2$) engine operation.

A NOx adsorber/catalyst generally stores NOx on a washcoat that is applied to a ceramic article, such as, for example, a porous substrate or filter. The washcoat blankets the walls defining the cells of the ceramic article with the storage material, providing a solid surface for NOx gas adsorption. Commercial washcoat blends, for example, may contain known NOx sorbents, which may include, by way of example only, platinum (Pt), rhodium (Rh), palladium (Pd), alkaline earth metals (e.g., magnesium (Mg), calcium (Ca), strontium (Sr) and barium (Ba)), alkali metals (e.g., lithium (Li), sodium (Na), potassium (K) and cesium (Cs)), rare earth elements (e.g., lanthanum (La) and yttrium (Y)), ceria, zirconia, titania, and compounds and compositions thereof. A washcoat's NOx adsorption ability is, therefore, generally determined based on the adsorbent performance of the sorbent used. For example, a potassium-based washcoat may be desirable because it may offer a relatively broad and high operating temperature window for NOx reduction activity, with less susceptibility to sulfur poisoning.

Some ceramic article materials, however, may react with potassium, thereby compromising the durability of the article and reducing the efficiency of NOx adsorption. Consequently, ceramic articles with high potassium-durability, such as, for example, ceramic articles based on blends of aluminum titanate and zirconium titanate (AT/ZT), have been developed. AT/ZT ceramic articles, for example, have demonstrated potassium-resistance during aging of the structure.

It may be desirable to provide ceramic articles that are relatively strong. Depending upon a particular application, it also may be desirable for ceramic articles to meet various performance requirements, for example, relating to strength, porosity and/or thermal expansion. For example, ceramic articles, including, for example, both filters and catalyst substrates, which are used as a base for a catalyst washcoat, generally require a relatively high total porosity to allow exhaust to pass through the walls of the structure. The ceramic article's strength, however, may be sacrificed with an increase in porosity. It may be desirable in at least some applications, therefore, to provide a ceramic article that is both porous and strong, and that exhibits potassium-durability and desirable thermal expansion properties. Accordingly, it may be desirable to increase the strength of a ceramic article, while substantially maintaining its porosity. It may further be desirable to increase the strength of a ceramic article, without negatively affecting its thermal expansion properties or its potassium-resistance.

SUMMARY

The present teachings may solve one or more of the above-mentioned problems and/or may demonstrate one or more of the above-mentioned desirable features. Other features and/or advantages may become apparent from the description that follows.

In accordance with various exemplary embodiments of the present teachings, a ceramic article may provide a sintered phase ceramic composition comprising aluminum titanate ($Al_2TiO_5$), zirconium titanate ($ZrTiO_4$), and a niobium-doped phase.

In accordance with various additional exemplary embodiments of the present teachings, a method for producing a ceramic article may comprise forming a ceramic precursor batch composition into a green body, the ceramic precursor batch composition comprising at least an alumina source, a titania source, a zirconium source, and a niobium source. The method may further comprise firing the green body under conditions effective to convert the ceramic precursor batch composition into a sintered phase ceramic composition.

Additional objects and advantages will be set forth in part in the description which follows, and in part will be obvious from the description, or may be learned by practice of the present teachings. The objects and advantages may be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF THE DRAWINGS

The present teachings can be understood from the following detailed description either alone or together with the accompanying drawings. The drawings are included to provide a further understanding, and are incorporated in and constitute a part of this specification. The drawings illustrate one or more exemplary embodiments of the present teachings and together with the description serve to explain various principles and operation.

DESCRIPTION OF EXEMPLARY EMBODIMENTS

Figure 1:
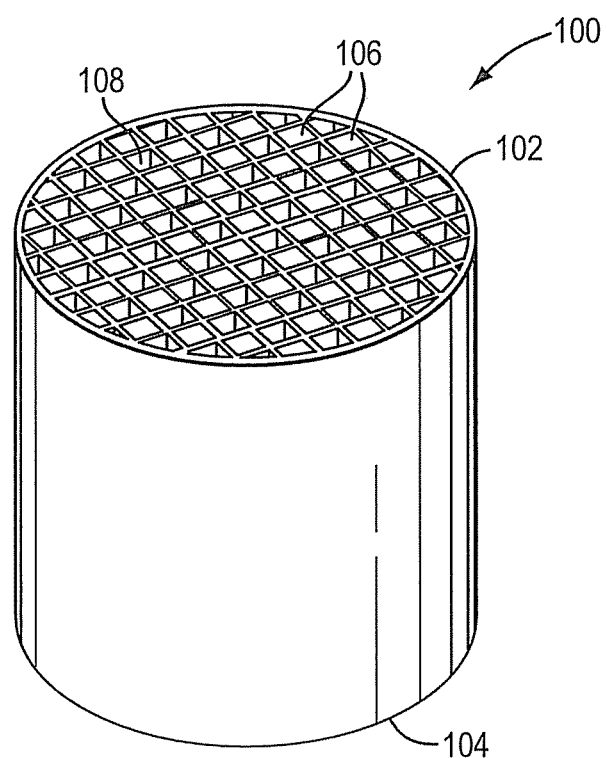
FIG. 1 is a perspective view of an exemplary embodiment of a ceramic article in accordance with the present teachings.

Ceramic articles have different property requirements, which may include, for example, strength, porosity and/or thermal expansion, depending upon the particular application for which they are being used. For example, for exhaust gas after-treatment applications, ceramic articles may serve as particulate filters, catalyst substrates, or a combination thereof, and may require a relatively high porosity. An article's porosity requirements, however, can often limit the mechanical strength of the structure, which may be measured by a modulus of rupture (MOR), for example. As porosity increases, an article's strength generally decreases as there is less connectivity of the solid phases. Thus, strength can become an issue for relatively highly porous articles, such as, for example, catalyst substrates and filters used in exhaust after-treatment applications. Many such after-treatment applications, however, also benefit from ceramic articles having a relatively high strength, such as, for example, various automotive applications in which a ceramic article may be subject to relatively large movements and/or vibrations. The strength of the ceramic article also may assist in making the article more durable to various catalyst materials, including, but not limited to, for example, potassium-based catalyst materials, that are applied thereto.

The present teachings show that adding niobium (Nb) in certain amounts to the batch material used for forming a ceramic article, for example, may improve the article's strength. Moreover, in at least some exemplary embodiments, adding niobium (Nb) in certain amounts to the batch material used for forming a ceramic article may increase the strength of the resulting ceramic article while the article's porosity is substantially maintained at a desirable level. During sintering, as firing temperatures increase, the niobium additive may be reduced from $Nb^{+5}$ to $Nb^{+4}$ and vaporize. Although not wishing to be bound by any particular theory, it is believed that the condensate of the niobate vapor may precipitate needle-like crystals, which serve to interconnect or "haystack" the base mineral composite forming the ceramic article, thereby improving its strength (e.g., increasing its MOR). This niobate vapor can additionally help to maintain the article's porosity at a desirable level.

It was further discovered that niobium can increase strength without significantly negatively affecting other desirable properties, such as, for example, thermal expansion and/or potassium-durability.

The present teachings, therefore, provide ceramic articles comprising a sintered phase ceramic composition comprising a niobium-doped phase; and methods of producing such ceramic articles from source materials that include a niobium source such as, for example, niobium pentoxide ($Nb_2O_5$). For example, in various exemplary embodiments, the ceramic articles may comprise a sintered phase ceramic composition comprising aluminum titanate ($Al_2TiO_5$) and zirconium titanate ($ZrTiO_4$) (also referred to as an AT/ZT composition) and a niobium-doped phase. Use of a sintered phase ceramic composition comprising AT/ZT may be desirable due to the resistance of AT/ZT to potassium-based catalyst materials, which may offer some advantages, as discussed above, over other catalyst materials. Also, in various exemplary embodiments, a ceramic article may be produced from a precursor batch composition comprising an alumina source, a titania source, a zirconia source, and a niobium source. In various exemplary embodiments of the present teachings, mineral percentages (%) are disclosed for the composite minerals aluminum titanate (AT), zirconium titanate (ZT), and the niobium-doped phase, whereas in various additional exemplary embodiments, molar percentages (mol %) are disclosed for the oxides alumina, titania, zirconia and niobium. Although specific mineral percentages are disclosed for various AT/ZT ceramic article applications, such as, for example, catalyst substrates and filters, those ordinarily skilled in the art would understand that the present teachings may be applied to any AT/ZT-based ceramic article depending on the article's particular application and desired property requirements.

As used herein, the term "ceramic article" or "article" refers to a ceramic structure produced by forming a ceramic precursor batch composition into a green body and firing the green body. As used herein, the term sintered phase ceramic composition refers to a ceramic composition produced by firing a ceramic precursor batch composition below its melting point (i.e., solid state sintering) so that the crystalline (and amorphous) particles of the final ceramic composition adhere to each other.

Exemplary ceramic articles include, for example, porous cellular ceramic structures, including, but not limited to, catalyst substrate structures, particulate filter structures, or a combination thereof (i.e., a structure configured to perform both filtration and adsorption/catalysis). NOx traps, for example, in accordance with exemplary embodiments of the present teachings may be capable of removing NOx from a flowing stream passing through the channels (cells) of the ceramic structure through adsorption onto a catalyst applied on the walls defining the channels. Particulate filters in accordance with additional exemplary embodiments of the present teachings may be capable of removing particulate matter from a flowing stream passing through the channels of the filter. Exemplary particulate filters of the present teachings may apply to the removal of any particulate matter from any flowing stream, and the flowing stream may be in the form of a gas or a liquid. The gas or liquid may also contain another phase, such as a solid particulate in either a gas or liquid stream, or droplets of liquid in a gas stream. Non-limiting, exemplary flowing streams include exhaust gases produced by internal combustion engines, such as, for example, diesel and gasoline engines, aqueous liquid streams, and coal combustion flue gases produced in a coal gasification process.

The ceramic articles in accordance with the present teachings can have any shape or geometry suitable for a particular application, as well as a variety of configurations and designs, including, but not limited to, for example, a wall-flow monolith structure, a flow-through monolith structure, or a partial-flow monolith structure (i.e., any combination of a wall-flow monolith structure and a flow-through monolith structure). Exemplary wall-flow monoliths include, for example, any monolithic structure comprising channels or porous networks or other passages with individual passages open and plugged at opposite ends of the structure, thereby enhancing flow through the channel walls of the monolith as the gases or liquids flow from one end to the other. Exemplary flow-through monoliths include, for example, any monolithic structure comprising channels or porous networks or other passages with individual passages open at both ends, thereby permitting the flow of a stream of material through the monolith passages from one end to an opposite end. Exemplary partial-flow monoliths include, for example, any monolithic structure that is partially wall-flow and partially flow-through.

FIG. 1 illustrates one exemplary embodiment of a ceramic article in accordance with the present teachings. The ceramic article 100 has an inlet end 102 an outlet end 104, and a plurality of channels 108 extending from the inlet end 102 to the outlet end 104. The channels 108 are defined by intersecting porous walls 106, thereby forming a generally cellular configuration (sometimes referred to as a honeycomb configuration by those ordinarily skilled in the art). Although the ceramic article 100 is depicted with channels having a substantially square cross-section (i.e., in a plane perpendicular to a longitudinal axis of the article 100), those ordinarily skilled in the art would understand that channels 108 can have various additional geometries, such as, for example, cross-sections that are circular, square, triangular, rectangular, hexagonal, sinusoidal, or any combination thereof, without departing from the scope of the present teachings.

Additionally, although the ceramic article 100 is depicted as cylindrical, those of ordinary skilled in the art would understand that such shape is exemplary only and ceramic structures produced in accordance with the present teachings may have a variety of shapes, including, but not limited to, block-shaped, cube-shaped, pyramid-shaped, etc. Also, although the exemplary embodiment of FIG. 1 illustrates a flow-through structure, those of ordinary skill in the art would understand that by blocking some of the channels 108 at one end or the other of the structure, a wall-flow or a partial-flow structure may be obtained.

As discussed above, ceramic articles based on blends of AT/ZT have been developed, as disclosed for example in U.S. Publication No. 2008/0203627, filed on Feb. 27, 2007, the teachings of which are incorporated by reference herein in their entirety. AT/ZT ceramic articles can be used in various applications, including, for example, in catalyst, filtration and/or combined catalyst and filtration applications. As will be described in more detail below, in accordance with exemplary embodiments of the present teachings, niobium may be added to the AT/ZT sintered phase ceramic composition to increase the resulting ceramic article's strength with little or no effect on at least some of the ceramic article's other properties. Accordingly, various exemplary embodiments of the present teachings contemplate the use of sintered phase ceramic compositions comprising aluminum titanate (AT), zirconium titanate (ZT), and a niobium-doped phase.

In various exemplary embodiments, the sintered phase ceramic composition may comprise relative mineral percentages ranging from about 60% to about 80% AT, from about 15% to about 35% ZT, with greater than about 0% to less than or equal to about 5% of a niobium-doped phase, or for example, less than or equal to about 4.5%, 4.0%, 3.5%, 3.0%, 2.5%, 2.0%, 1.5%, 1.0% or 0.5% of a niobium-doped phase. For a given ceramic composition, ordinarily skilled artisans would understand how to determine the various phases and amounts of those phases in a sintered phase ceramic composition, including, for example, the amount of any niobium-doped phases. For example, one technique for making such a determination includes Rietveld analysis, which can quantify the relative amounts of the phases in the sintered phase ceramic composition. In other words, one ordinarily skilled in the art would understand how to detect the amounts of AT and ZT in the blend, and would further understand that the niobium, if not in a separate phase, could be separated by chemical analysis. Ordinarily skilled artisans would further understand how to quantify the relative amounts of each phase in an AT and ZT blend through other methods, such as, for example, quantitative analysis using X-ray diffraction, comparing the unknown amounts with standards of known amounts of each phase.

Various exemplary embodiments of the present teachings also include a sintered phase ceramic composition having a desired strength, for example, as measured by a modulus of rupture (MOR). For at least some catalyst substrate and filter applications, for example, it may be desirable that a ceramic article's strength is relatively high. Thus, in various exemplary embodiments, the sintered phase ceramic composition can have a modulus of rupture greater than or equal to about 100 pounds per square inch (psi), for example, greater than or equal to about 250 psi.

Various exemplary embodiments of the present teachings further contemplate a sintered phase ceramic composition having various desired properties, such as, for example, total porosity (e.g., as measured by mercury porosimetry with which those having ordinary skill in the art are familiar) and coefficient of thermal expansion (e.g., as measured by dilatometry with which those having ordinary skill in the art are familiar). For at least some catalyst substrate and filter applications, for example, it may be desirable for a ceramic article's porosity to be relatively high. Thus, in various exemplary embodiments, the sintered phase ceramic composition can have a total porosity greater than or equal to about 25%, for example, greater than or equal to about 55%. In various other exemplary embodiments, the sintered phase ceramic composition of a catalyst substrate may have a total porosity ranging from about 25% to about 40%, and the sintered phase composition of a filter may have a total porosity ranging from about 35% to about 55%.

On the other hand, in at least some catalyst substrate and filter applications, for example, it may be desirable for a ceramic article's thermal expansion requirements to be relatively low (i.e., to provide good thermal shock resistance). Thus, in various additional exemplary embodiments, the sintered phase ceramic composition can have a coefficient of thermal expansion in at least one direction that is less than or equal to about $10.0 \times 10^{-7}$.

As those ordinarily skilled in the art would understand, exemplary embodiments of the present teachings further contemplate sintered phase ceramic compositions having various other and/or additional desired properties. Accordingly, those ordinarily skilled in the art would understand that the above properties and ranges are exemplary only and not intended to limit the scope of the present teachings; those ordinarily skilled in the art would further understand how to modify a sintered phase ceramic composition in accordance with the present teachings to achieve other desired properties.

In various exemplary embodiments, the ceramic articles of the present teachings can further comprise an alkali washcoating. As those of ordinary skill in the art would appreciate, the particular alkali washcoating used will depend upon the particular species to be adsorbed and/or filtered from an exhaust stream. However, by way of non-limiting example only, wherein the ceramic article is for adsorbing and/or reducing one or more of hydrocarbon (HC), carbon monoxide (CO), nitrogen oxides (NOx), and particulate matter (PM) from an exhaust stream, the alkali washcoating can comprise, by way of example only, platinum; rhodium; palladium; ceria; zirconia; titania; an alkali metal, such as for example, potassium, sodium, rubidium, and cesium; an alkali earth metal catalyst, such as for example, magnesium, calcium, strontium, barium, lanthanum, and yttrium; and/or any and compounds and compositions thereof. In various exemplary embodiments, as noted above, alkali washcoatings comprising potassium, either alone or in combination with other alkali metals or alkali earth metal catalysts may be desirable because, in comparison to other alkali metals or alkali earth metals, potassium may better convert NOx at high temperatures, such as, for example, those associated with various exhaust gas after-treatment applications.

The present teachings further provide methods for producing the ceramic articles described herein. Those ordinarily skilled in the art would understand, for example, that any high temperature ceramic processing methods, such as, for example, reaction-sintering or melting of inorganic batch precursors can be used to produce the ceramic articles. Various exemplary embodiments of the present teachings, however, generally provide the steps of first forming a ceramic precursor batch composition into a green body, and then firing the green body under conditions effective to convert the ceramic precursor composition into a sintered phase ceramic composition.

In various exemplary embodiments, wherein the ceramic article comprises an AT/ZT sintered phase ceramic composition, the ceramic precursor batch composition may contain at least an alumina source, a titania source, a zirconia source, and a niobium source. The ceramic precursor batch components can also comprise naturally occurring and/or synthetically produced materials including components in the form of carbonates, phosphates, nitrates, citrates, sulfides, hydrates, oxides, and the like. Thus, those ordinarily skilled in the art would understand that the present teachings are not limited to any particular types of powders or raw materials, but that the ceramic precursor batch components can be selected depending on the properties desired in the final ceramic article.

Those ordinarily skilled in the art would also appreciate that the amount of each ceramic precursor batch component can be selected so as to yield a resulting sintered phase ceramic composition having the desired mineral percentages as described above. The selection and/or determination of such amounts would also be readily obtainable by one of ordinary skill in the art based upon the properties desired in the final ceramic article. In various exemplary embodiments of the present teachings, for example, the ceramic precursor batch composition may contain from about 25 mol % to about 50 mol % alumina. In various exemplary embodiments, the ceramic precursor batch composition may contain about from 35 mol % to about 55 mol % titania. In various additional exemplary embodiments, the ceramic precursor batch composition may comprise from about 10 mol % to about 20 mol % zirconia. In various further embodiments, the ceramic precursor batch composition may contain greater than 0 mol %, for example greater than or equal to about 0.5 mol %, to less than or equal to about 5 mol % niobium pentoxide, or for example less than or equal to about 4.5 mol %, 4.0 mol %, 3.5 mol %, 3.0 mol %, 2.5 mol %, 2.0 mol %, 1.5 mol %, or 1.0 mol % niobium pentoxide.

In various exemplary embodiments of the present teachings, the ceramic precursor batch composition may also contain a pore forming agent in order to optimize the porosity and the pore size distribution in the ceramic article for a particular application. A pore forming agent is a fugitive material that can, for example, evaporate or undergo vaporization by combustion during the firing of the green body to obtain a desired, usually higher, porosity and/or coarser median pore diameter. Exemplary pore forming agents may include, for example, a starch, carbon or graphite. The pore forming agent can be used in virtually any amount that is sufficient to achieve a desired level of porosity. In various exemplary embodiments, the pore forming agent may comprise a starch, such as, for example, potato, rice, or corn starch.

The ceramic precursor batch components and the pore forming agent can then be blended with a liquid vehicle and forming aids, such as, for example, an organic binder, which can impart plastic forming ability and green strength to the raw materials when they are formed into the green body. Those ordinary skilled in the art would understand that a green body may be formed by any known ceramic forming process, such as, for example, molding or extruding the ceramic precursor batch composition into a green body. When forming is done by extrusion, for example, a cellulose ether binder, such as, for example, methylcellulose or hydroxypropyl methylcellulose can be used as an organic binder. Furthermore, the liquid vehicle component can include, for example, water, or depending on the component parts of the ceramic batch composition, various organic solvents, such as, for example, methanol, ethanol, or any combination thereof. The relative amounts of organic binder and liquid vehicle can also vary depending on factors such as the nature and amounts of the raw materials used in the batch composition.

The firing conditions effective to convert the ceramic precursor batch composition into a sintered phase ceramic composition can additionally vary depending on the process conditions, such as, for example, the specific batch composition, the size of the green body, and the nature of the equipment used. Those ordinarily skilled in the art would understand, however, given a set of process conditions, how to determine the optimal firing conditions to obtain a ceramic article in accordance with the present teachings. The present teachings are, therefore, not limited to specific firing temperatures and/or times. Various exemplary embodiments of the present teachings, however, contemplate firing the green body at a temperature ranging from about 1300° C. to about 1600° C., for example, from about 1400° C. to about 1550° C.

In various exemplary embodiments of the present teachings, once the green body has been fired, an alkali catalyst washcoat can be applied to the resulting sintered phase ceramic composition (i.e., the ceramic article). As above, the alkali catalyst washcoat can comprise, by way of example only, platinum; rhodium; palladium; ceria; zirconia; titania; an alkali metal, such as for example, potassium, sodium, rubidium, and cesium; an alkali earth metal, such as for example, magnesium, calcium, strontium, barium, lanthanum, and yttrium; and/or compositions and compounds thereof. Furthermore, the washcoat can be applied to the ceramic article using any known method including, for example, dip-coating the ceramic article into a washcoat solution for a period of time sufficient to achieve a substantially even coating layer. Excess coating can then be removed from the article using, for example, compressed air, and the article can be dried.

As discussed above, the present teachings disclose that adding niobium to a ceramic composite, such as, for example, to an AT/ZT composite, can improve the ceramic article's strength without significantly negatively impacting the article's other desirable properties. Depending upon the application, however, ceramic articles have different desirable properties, including, for example, strength, porosity and/or thermal expansion.

To illustrate various principles of the present teachings and how the ceramic articles and methods disclosed herein can be made and evaluated, experiments were conducted to examine how various combinations of batch materials, including niobium, and various firing temperatures can affect ceramic substrate and filter properties, as shown and described with reference to FIGS. 2-7.

Examples

Corresponding to Samples A-I in Table 1

In the examples corresponding to the results shown in FIGS. 2-7, AT/ZT ceramic compositions with various levels of Nb (including no Nb) added were made and tested for various properties, wherein the ceramic precursor batch composition included $Al_2O_3$, $ZrO_2$, $TiO_2$, and $Nb_2O_5$. In addition to samples with no Nb added, the $Nb_2O_5$ was added at levels of about 0.5 mol %, 1.3 mol % and 2.5 mol %, while other variables, such as, for example, alumina particle size (i.e., type of alumina), percent pore former (i.e., pore forming agent), and the type of pore former used were held constant.

The batch materials for the ceramics included an alumina with a particle size of about 11 μm and about 10% potato starch (i.e., pore former), with solid binders and organics of about 5-10 weight percent (wgt %) methylcellulose added on top. The powders were mixed by turbula, and liquids (e.g., Emulsia T, Tall Oil, and $H_2O$) were added during dry blending, using a Littleford mixer, to reach a clay-like consistency. The liquid weight % ranged from about 8% to about 12%.

A small RAM extruder was used to extrude 10 inch lengths of ware that had 200 cells per square inch (CPSI) with 12 mil thick walls (i.e., 200/12 ware). The ware was dried in a 100° C. oven for 12 hours (e.g., "hot air dry") and 3 inch lengths of ware were fired in air with $MoSi_2$ elements at various temperatures of 1400° C., 1425° C., 1450° C., 1475° C., 1500° C., and 1550° C. The ramp rate from room temperature to the maximum temperatures noted above was 60° C./hr, the dwell time was 16 hours, and the ramp rate back down to room temperature was 300° C./hr. The lengths of the pieces were measured before and after firing to determine length changes.

Bars were prepared to 8 cm lengths and 3×3 roughly equal sized cells, with the bars having an overall width and height of 0.25 in.×0.25 in. The bars were tested via dilatometer to provide coefficient of thermal expansion (CTE) data; deskinned 2.5 mm long pieces were submitted for porosity testing via mercury intrusion; powdered pieces were submitted for phase identification by x-ray diffraction (XRD); and MOR bars were cut from 8 cm lengths with 3×6 roughly equal sized cells, with the bars having an overall width and height of 0.25 in.×0.5 in, and were tested via a strength vs. flexure text.

The table below summarizes a number of the example AT/ZT compositions and their respective measured properties.

TABLE 1

Example AT/ZT Compositions and Properties

| Sample | Firing Temp (° C.) | Strength (MOR, psi) | CTE at 1000° C. ($E^{-7}$) | Total Porosity (%) | AT/ZT/$Nb_2O_5$ Ratio | $ZrO_2$ mol % | $TiO_2$ mol % | $Al_2O_3$ mol % | $Nb_2O_5$ mol % |
|---|---|---|---|---|---|---|---|---|---|
| A | 1550 | 77 | −5.6 | 37.5 | 75/25/0 | 12.6 | 37.5 | 49.9 | 0 |
| B | 1450 | 188 | −1.5 | 44.2 | 70/30/0 | 15.0 | 50.0 | 35.0 | 0 |
|   | 1475 | 165 | −4.9 | 43.3 | 70/30/0 | 15.0 | 50.0 | 35.0 | 0 |
|   | 1500 | 161 | −4.8 | 39.3 | 70/30/0 | 15.0 | 50.0 | 35.0 | 0 |
| C | 1425 | 171 | 1.1 | 43.8 | 70/29/1 | 14.5 | 50.0 | 35.0 | 0.5 |
|   | 1450 | 149 | −2.2 | 43.5 | 70/29/1 | 14.5 | 50.0 | 35.0 | 0.5 |
|   | 1475 | 146 | −5.3 | 38.5 | 70/29/1 | 14.5 | 50.0 | 35.0 | 0.5 |
|   | 1500 | 143 | −4.5 | 34.7 | 70/29/1 | 14.5 | 50.0 | 35.0 | 0.5 |
| D | 1425 | 179 | −0.9 | 40.4 | 75/24/1 | 12.0 | 50.0 | 37.5 | 0.5 |
|   | 1450 | 142 | −3.5 | 43.5 | 75/24/1 | 12.0 | 50.0 | 37.5 | 0.5 |
|   | 1475 | 129 | −4.9 | 36.8 | 75/24/1 | 12.0 | 50.0 | 37.5 | 0.5 |
|   | 1500 | 127 | −7.8 | 36.0 | 75/24/1 | 12.0 | 50.0 | 37.5 | 0.5 |
| E | 1425 | 243 | n/a | 39.2 | 75/23/2 | 11.3 | 50.0 | 37.5 | 1.3 |
|   | 1450 | 243 | −3 | 39.5 | 75/23/2 | 11.3 | 50.0 | 37.5 | 1.3 |
|   | 1475 | 207 | −5.3 | 36.6 | 75/23/2 | 11.3 | 50.0 | 37.5 | 1.3 |
|   | 1500 | 180 | −6.6 | 34.5 | 75/23/2 | 11.3 | 50.0 | 37.5 | 1.3 |
| F | 1425 | 201 | 5.9 | 40.9 | 70/27/3 | 13.8 | 50.0 | 35.0 | 1.3 |
|   | 1450 | 208 | −2.2 | 38.4 | 70/27/3 | 13.8 | 50.0 | 35.0 | 1.3 |
|   | 1475 | 170 | −3.5 | 36.4 | 70/27/3 | 13.8 | 50.0 | 35.0 | 1.3 |
|   | 1500 | 163 | −6.7 | 36.8 | 70/27/3 | 13.8 | 50.0 | 35.0 | 1.3 |
| G | 1450 | 290 | −0.9 | 38.9 | 75/22/2 | 11.4 | 49.3 | 38.0 | 1.3 |
|   | 1500 | 143 | −4 | 37.7 | 75/22/2 | 11.4 | 49.3 | 38.0 | 1.3 |
| H | 1500 | 400 | 7.6 | 36.8 | 76/19/5 | 10.0 | 47.5 | 40.0 | 2.5 |
| I | 1400 | 259 | 33.8 | 35.3 | 60/35/5 | 17.9 | 48.7 | 30.8 | 2.5 |
|   | 1450 | 216 | 20.7 | 36.6 | 60/35/5 | 17.9 | 48.7 | 30.8 | 2.5 |

As shown by the data in Table 1, the samples which included a niobium-doped phase (i.e., samples C, D, E, F, G, H, and I) generally showed an increase in strength, as demonstrated by an increase in MOR (psi), compared to the samples without niobium (i.e., samples A and B). The degree of increase depended on both the level (mol %) of $Nb_2O_5$ added to the precursor batch composition and the firing temperature (° C.) of the sample.

Figures 2, 3:
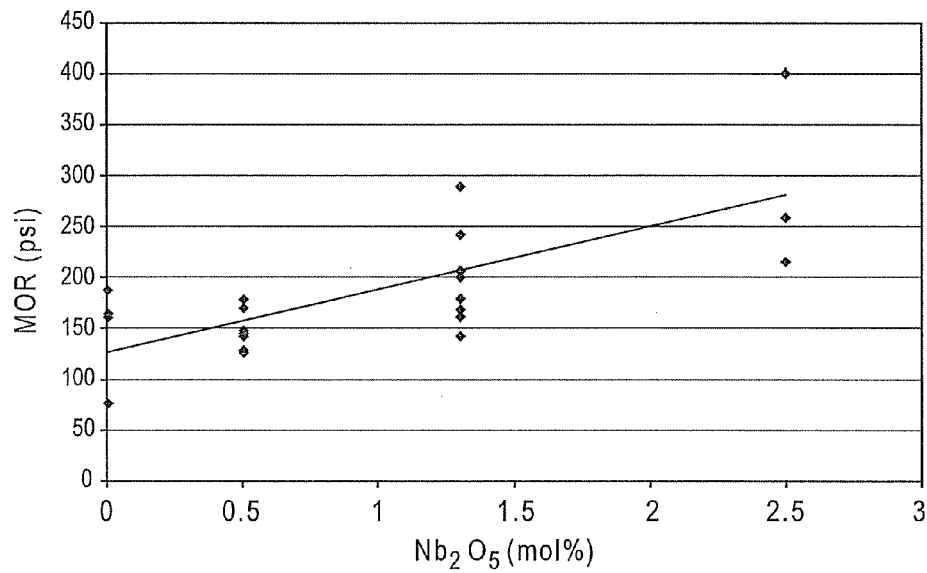
FIG. 2 is a graph illustrating modulus of rupture (psi) versus niobium pentoxide (mol %) for various ceramic article samples.
FIG. 3 is a graph illustrating average modulus of rupture (psi) versus niobium pentoxide (mol %) for ceramic article samples fired at various temperatures.

FIG. 2 illustrates MOR (psi) as a function of niobium pentoxide (mol %) for the data obtained from the ceramic article samples in Table 1, as well as a least squares fit of the plotted data (shown by the line through the data points). As illustrated by FIG. 2, as the level of niobium pentoxide was increased from 0 mol % to 2.5 mol % the strength of the samples, as demonstrated by an increase in MOR (psi), also generally increased.

FIG. 3 is a bar graph illustrating average MOR (psi) as a function of niobium pentoxide (mol %) for the data obtained from the ceramic article samples in Table 1 for the various firing temperatures indicated in Table 1. As also illustrated in FIG. 3, as the level of niobium was increased from 0 mol % to 2.5 mol % the strength of the samples, as demonstrated by an increase in average MOR (psi), also generally increased. As shown in FIG. 3, however, the degree of increase also depended on the firing temperature (° C.) of the sample.

Figure 4:
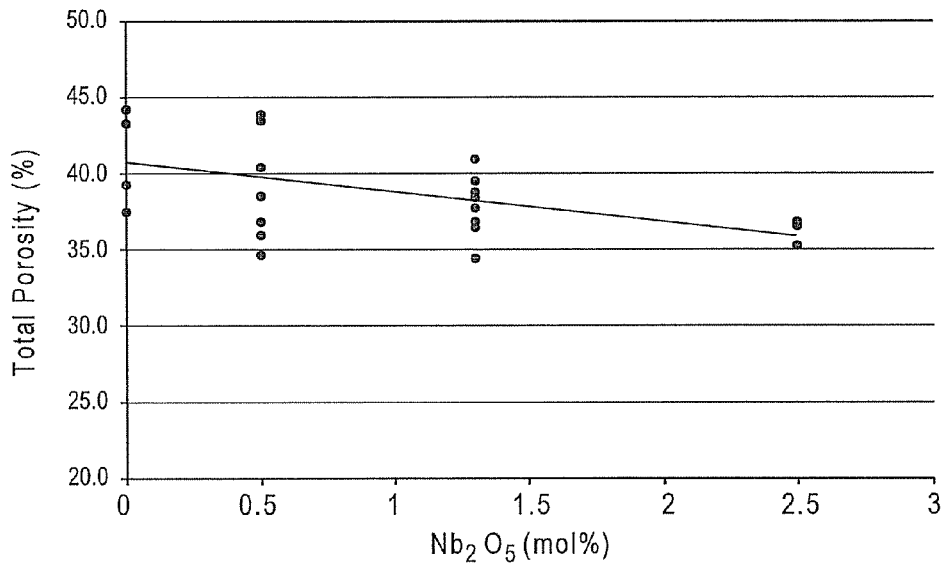
FIG. 4 is a graph illustrating total porosity (%) versus niobium pentoxide (mol %) for various ceramic article samples.

FIG. 4 illustrates total porosity (%) as a function of niobium pentoxide (mol %) for the data obtained from the ceramic article samples in Table 1, as well as the least squares fit of the plotted data (shown by the line through the data points). As demonstrated by FIG. 4, the addition of niobium pentoxide had a relatively minor effect on the total porosity of the samples. As the level of niobium pentoxide was increased from 0 mol % to 2.5 mol %, the total porosity of the samples decreased only slightly from just above 40% to just about 35%.

Figure 5:
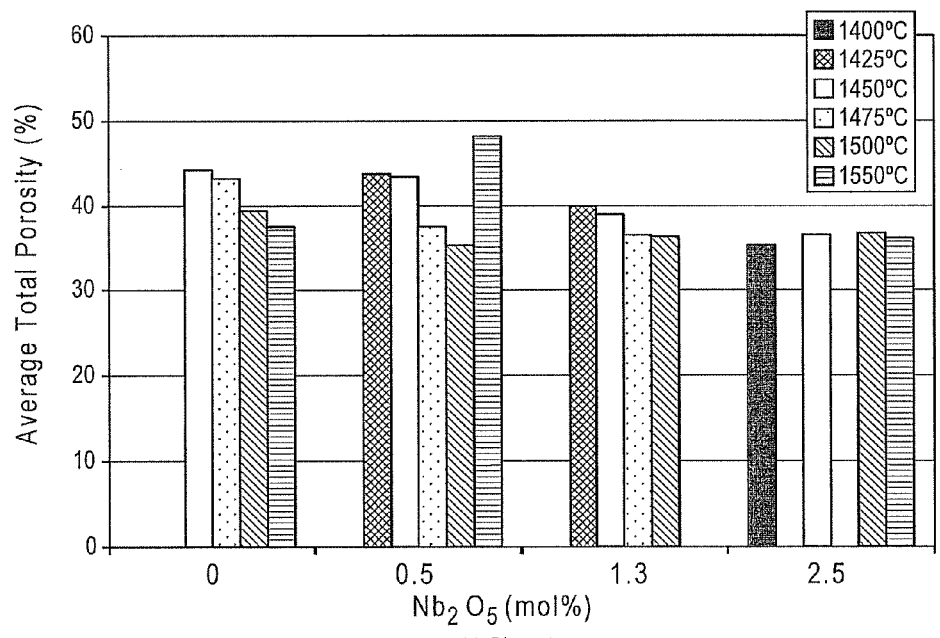
FIG. 5 is a graph illustrating average total porosity (%) versus niobium pentoxide (mol %) for ceramic article samples fired at various temperatures.

FIG. 5 is a bar graph illustrating average total porosity (%) as a function of niobium pentoxide (mol %) for the data from the ceramic article samples in Table 1 for the various firing temperatures indicated in Table 1. As also illustrated in FIG. 5, the addition of niobium pentoxide (i.e., from 0 mol % to 2.5 mol %) had a relatively minor effect on the average total porosity of the samples. Consequently, based on the results in FIGS. 4 and 5, the present teachings show that niobium can generally strengthen AT/ZT ceramic articles, while maintaining relatively high levels (e.g., greater than about 35%) of porosity.

Figure 6:
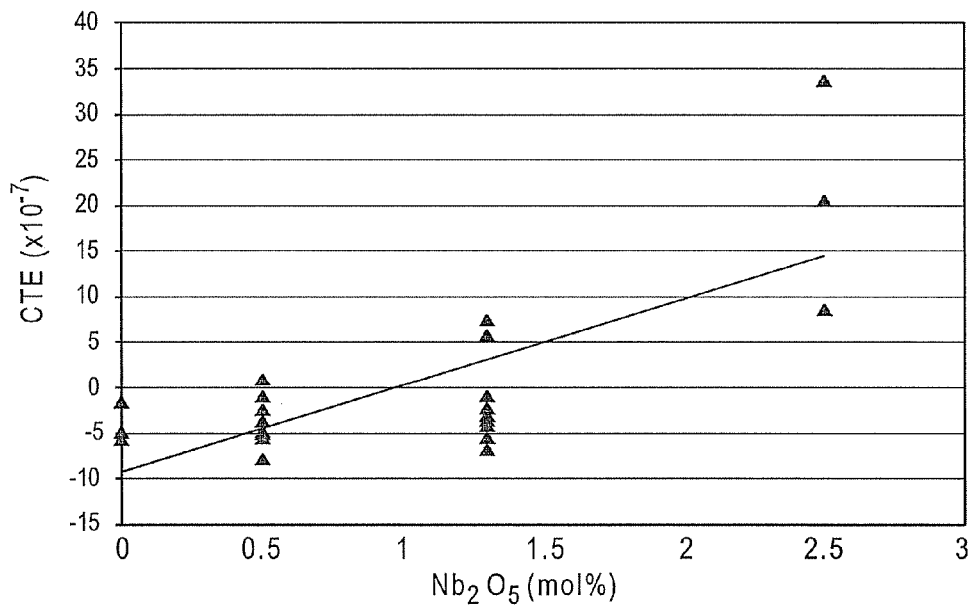
FIG. 6 is a graph illustrating coefficient of thermal expansion ($\times 10^{-7}$) as a function of niobium pentoxide (mol %) for various ceramic article samples.

FIG. 6 illustrates coefficient of thermal expansion (CTE) ($\times 10^{-7}$) as a function of niobium pentoxide (mol %) for data obtained from the ceramic article samples in Table 1, as well as the least squares fit of the plotted data (shown by the line through the data points). As shown in FIG. 6, niobium had a relatively minor effect on the thermal expansion of the samples particularly at relatively lower levels (e.g., 0.5 mol % and 1.3 mol % $Nb_2O_5$).

Figure 7:
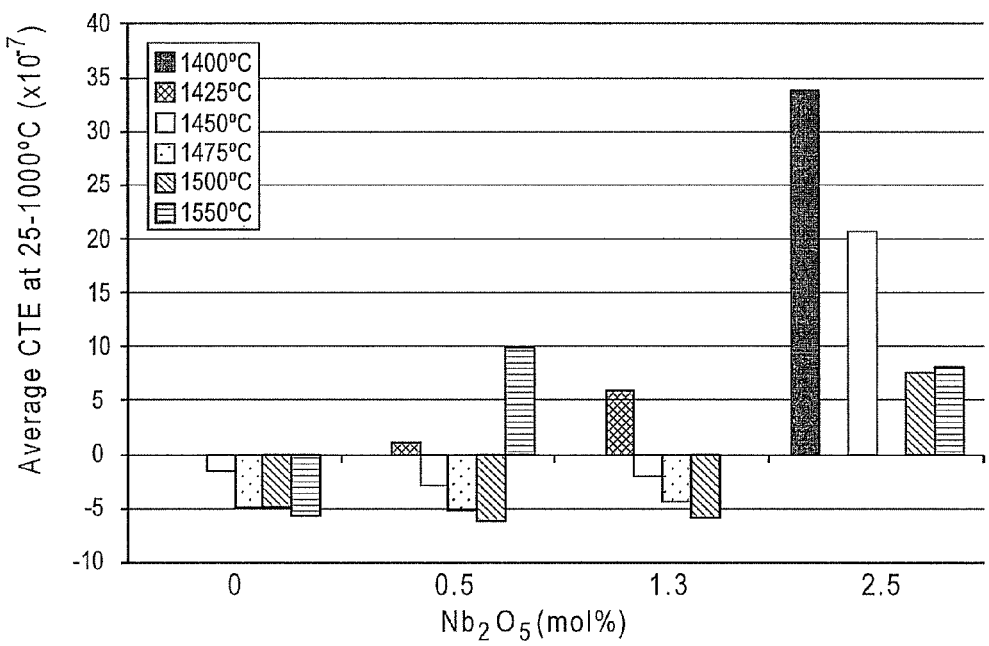
FIG. 7 is a graph illustrating average coefficient of thermal expansion ($\times 10^{-7}$) as a function of niobium pentoxide (mol %) for ceramic article samples fired at various temperatures.

FIG. 7 is a bar graph illustrating average CTE as a function of niobium pentoxide (mol %) for the ceramic article samples in Table 1 for the various firing temperatures indicated in Table 1. As also illustrated in FIG. 7, the addition of niobium pentoxide (i.e., from 0 mol % to 2.5 mol %) had a relatively minor effect on the average CTE of the samples. For example, those ordinarily skilled in the art would understand, as demonstrated in FIG. 7, that a sample's firing temperature can be adjusted to maintain a relatively low CTE even at relatively higher niobium levels (e.g., 2.5 mol %). Consequently, based on the results of FIGS. 6 and 7, the present teachings demonstrate that niobium can generally strengthen AT/ZT ceramic articles, while maintaining relatively low thermal expansion (i.e., relatively low CTEs).

Using an electron probe micro-analyzer (EPMA), it was determined that, for the above samples C, D, E, F, G, H and I that included a niobium-doped phase, the majority of niobium existed within the ZT phase. Therefore, the present teachings demonstrate that niobium does not significantly negatively impact the resulting ceramic article's potassium-resistance. As above, due to its high potassium-durability, an AT/ZT-based ceramic article is particularly disposed towards adsorber/catalyst applications, such as, for example, LNT applications. Consequently, ceramic articles based on blends of AT/ZT have been developed for use with potassium-based washcoats. Niobium, however, can strengthen AT/ZT ceramic articles, while also maintaining potassium-resistance.

Those ordinarily skilled in the art would understand that various other characteristics of the ceramic articles may be altered as desired, including, for example, the types of materials used for the articles (e.g., type of alumina, tinania, zirconia, and niobium), and the types and/or amounts of pore forming agents (e.g., type and/or amount of starch). Consequently, to determine optimal batch materials and percentages to achieve targeted substrate and filter parameters, other variables were tested, such as, for example, alumina particle size (i.e., type of alumina), percent pore former (i.e., pore forming agent), and the type of pore former used.

Examples

Corresponding to Sample J-Q in Table 2

As above, in the examples, niobium pentoxide was added to an AT/ZT composite wherein the ceramic precursor batch composition included $Al_2O_3$, $ZrO_2$, $TiO_2$, and $Nb_2O_5$. In addition to no $Nb_2O_5$ being added, the $Nb_2O_5$ was added at levels of about 0.5 mol %, 1.3 mol % and 2.5 mol %, and the samples were fired at 1550° C.

The table below summarizes a number of the example AT/ZT compositions and their respective properties.

TABLE 2

Additional Example AT/ZT Compositions and Properties

| Sample | Strength (MOR, psi) | CTE at 1000° C. ($E^{-7}$) | Total Porosity (%) | AT/ZT/ $Nb_2O_5$ Ratio | $ZrO_2$ mol % | $TiO_2$ mol % | $Al_2O_3$ mol % | $Nb_2O_5$ mol % | Alumina (μm) | Pore Former (% Starch) |
|---|---|---|---|---|---|---|---|---|---|---|
| J | 16.1 | 6.8 | 47.6 | 75/25/0 | 12.53 | 49.95 | 37.51 | 0 | 33 | 10% potato |
| K | 32.3 | 10 | 48.3 | 75/24/1 | 11.14 | 53.63 | 34.8 | 0.5 | 33 | 10% potato |
| L | 56.4 | 13.1 | 45.35 | 75/22/2 | 11.42 | 49.32 | 37.99 | 1.3 | 33 | 10% potato |
| M | 24.4 | 27.1 | 52.04 | 75/22/2 | 11.42 | 49.32 | 37.99 | 1.3 | 47 | 10% potato |
| N | 101.1 | 10.7 | 38.5 | 75/22/2 | 11.42 | 49.32 | 37.99 | 1.3 | 22 | 5% potato/ 5% corn |
| O | 298.1 | 4 | 26.47 | 76/19/5 | 10.02 | 47.46 | 40.02 | 2.5 | 11 | 5% corn |
| P | 666.5 | 76 | 45.9 | 76/19/5 | 10.02 | 47.46 | 40.02 | 2.5 | 33 | 10% potato |
| Q | 180.6 | 8.5 | 35.7 | 76/19/5 | 10.02 | 47.46 | 40.02 | 2.5 | 11 | 10% corn |

As shown in Table 2, the samples which included a niobium-doped phase ($Nb_2O_5$ was added) (i.e., samples K, L, M, N, O, P and Q) showed an increase in strength, as demonstrated by an increase in MOR (psi), compared to the samples where no niobium pentoxide was added (i.e., sample J). The degree of increase, however, further depended on other factors, such as, for example, the type of alumina, the type/amount of pore former, and the firing temperature.

Exemplary embodiments of the present teachings thus provide ceramic articles and methods of producing ceramic articles based on ceramic compositions comprising a blend of AT/ZT and a niobium-doped phase, wherein the niobium-doped phase can increase the strength of the AT/ZT ceramic article, and also may maintain its porosity, thermal expansion and/or potassium-resistance. For example, various exemplary embodiments of the present teachings may produce a ceramic article by forming a ceramic precursor batch composition into a green body, the ceramic precursor batch composition containing at least an alumina source, a titania source, a zirconia source, and a niobium source; and firing the green body under conditions effective to convert the ceramic precursor batch composition into a sintered phase ceramic composition. Various exemplary embodiments may accomplish this by forming a ceramic precursor batch composition containing about 25 mol % to about 50 mol % alumina, about 35 mol % to about 55 mol % titania, about 10 mol % to about 20 mol % zirconia, and greater than about 0 mol %, for example greater than or equal to about 0.5 mol %, to less than or equal to about 5 mol % niobium pentoxide, for example, less than or equal to about 4.5 mol %, 4.0 mol %, 3.5 mol %, 3.0 mol %, 2.5 mol %, 2.0 mol %, 1.5 mol %, or 1.0 mol %.

In various exemplary embodiments, firing the green body under conditions effective to convert the ceramic batch precursor composition into a sintered phase ceramic composition may comprise firing the green body at a temperature ranging from about 1300° C. to about 1600° C., for example, from about 1400° C. to about 1550° C.

As above, other characteristics of the ceramic articles and methods of producing the same, in accordance with the present teachings may also be altered as desired, including, for example, the types of materials used for the articles (e.g., type of alumina, tinania, zirconia, and niobium), types and/or amounts of pore forming agents (e.g., type and/or amount of starch), firing conditions (e.g., temperatures, atmosphere, hold times and ramps), and the structural configuration (e.g., dimensions, shapes, etc.). Ordinarily skilled artisans would understand that ceramic articles in accordance with the present teachings may include any number of AT/ZT-based articles, including, for example, AT/ZT-based substrates, particulate filters and/or other porous ceramic structures, without departing from the scope of the present teachings. Utilizing the present teachings, as described above with regard to the experimental AT/ZT sample articles, those ordinarily skilled in the art would understand how to produce articles for various additional applications, meeting, for example, various additional parameters and/or desirable properties.

Furthermore, although various exemplary embodiments of the present teachings refer to producing ceramic articles, such as, for example, lean NOx traps, the present teachings encompass a wide range of ceramic articles useful in various applications and for treating and/or filtering various types of gases and/or particulate matters. Exemplary applications include, but are not limited to, for example, ceramic articles for use in coal combustion power plants, gasoline engines, diesel engines, catalyst substrate applications, and for stationary and non-stationary applications.

For the purposes of this specification and appended claims, unless otherwise indicated, all numbers expressing quantities, percentages or proportions, and other numerical values used in the specification and claims, are to be understood as being modified in all instances by the term "about" if they are not already. Accordingly, unless indicated to the contrary, the numerical parameters set forth in the following specification and attached claims are approximations that may vary depending upon the desired properties sought to be obtained by the present teachings. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It should be understood that while the invention has been described in detail with respect to various exemplary embodiments thereof, it should not be considered limited to such, as numerous modifications are possible without departing from the broad scope of the appended claims.

We claim:

1. A ceramic article, comprising:
a sintered phase ceramic composition comprising from about 60% to about 80% aluminum titanate ($Al_2TiO_5$), from about 15% to about 35% zirconium titanate ($ZrTiO_4$), and a niobium-doped phase present in an amount ranging from greater than 0% to less than or equal to about 5%.

2. The ceramic article of claim 1, further comprising an alkali washcoating on the sintered phase ceramic composition.

3. The ceramic article of claim 2, wherein the alkali washcoating comprises potassium.

4. The ceramic article of claim 1, wherein the sintered phase ceramic composition has a modulus of rupture greater than or equal to about 100 pounds per square inch.

5. The ceramic article of claim 1, wherein the sintered phase ceramic composition has a modulus of rupture greater than or equal to about 250 pounds per square inch.

6. The ceramic article of claim 1, wherein the sintered phase ceramic composition has a total porosity greater than or equal to about 25%.

7. The ceramic article of claim 1, wherein the sintered phase ceramic composition has a total porosity greater than or equal to about 55%.

8. The ceramic article of claim 1, wherein the sintered phase ceramic composition has a coefficient of thermal expansion in at least one direction that is less than or equal to about $10.0 \times 10^{-7}$.

9. The ceramic article of claim 1, wherein the ceramic article comprises a honeycomb structure.

10. The ceramic article of claim 1, wherein the ceramic article comprises a catalyst substrate.

11. The ceramic article of claim 1, wherein the ceramic article comprises a filter.

12. The ceramic article of claim 1, wherein the ceramic article comprises a NOx trap.

* * * * *